May 14, 1963  S. J. KOSIK, JR  3,089,712
SPLASH GUARD
Filed July 30, 1962
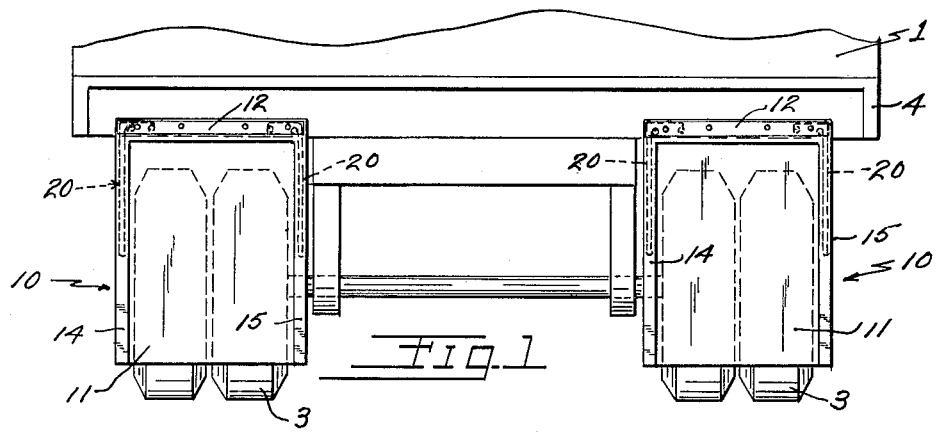
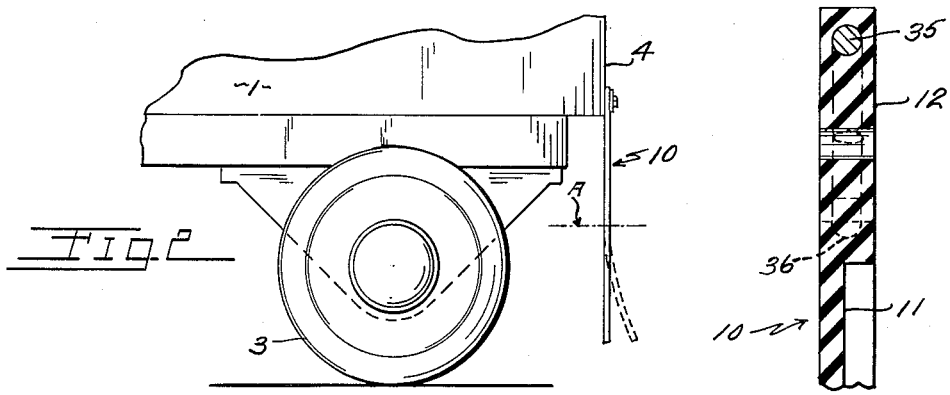
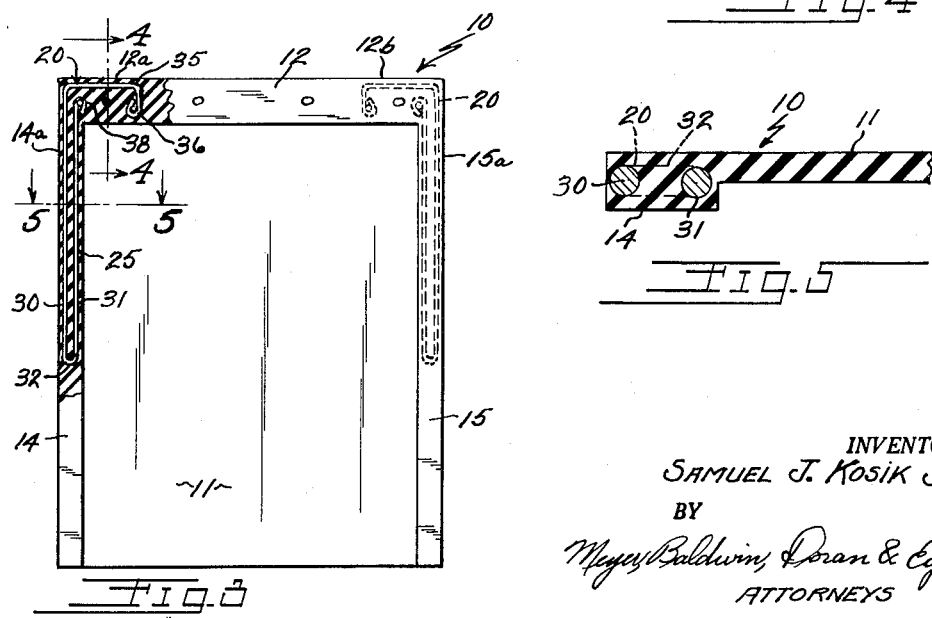
INVENTOR.
SAMUEL J. KOSIK JR.
BY
Meyers, Baldwin, Doran & Egan
ATTORNEYS

3,089,712
SPLASH GUARD
Samuel J. Kosik, Jr., 1900 E. 30th St., Suite 305,
Cleveland, Ohio
Filed July 30, 1962, Ser. No. 213,310
5 Claims. (Cl. 280—154.5)

The present invention is directed to a splash guard for the rear wheels of a truck, trailer or other large vehicle.

Splash guards have been used on vehicles to prevent excessive amounts of water, mud, dirt or other foreign matter from being thrown onto the windshield or other front portion of a second vehicle that is following the first vehicle. In the past, it has been desirable to make the splash guards of rubber. However, the rubber guards generally are too flexible and sometimes have been unsuitable in use because they ride on the tire, ride over the tire, or sail backwardly in a "tail-gating" position. The above conditions render the splash guard ineffective and in some localities, it is unlawful for the guard to flex more than only six inches from the vertical.

The present invention provides anti-sail rods that are molded in a rubber splash guard to produce an anti-sail guard that is rigid, rustproof, safe and, yet, the guard effectively prevents the bottom of the guard from flexing or flapping more than about six inches from the vertical.

It is an object of the present invention to provide an improved splash guard for the rear wheels of a vehicle such as a truck.

It is an object of the present invention to provide a splash guard in which a stiffening means is provided for the upper portion thereof whereby the lower portion flexes less than six inches from the vertical upon use.

Other objects will be apparent from the specification that follows, the appended claims and the drawings, in which:

FIG. 1 is an elevational view of the rear of a truck provided with the improved splash guards of the present invention;

FIG. 2 is a fragmentary side elevational view illustrating the use of the improved splash guards shown in FIG. 1;

FIG. 3 is a plan view of the splash guard, a portion thereof being broken away to illustrate the novel reinforcing means;

FIG. 4 is a fragmentary sectional view taken along the line indicated at 4—4 in FIG. 3; and FIG. 5 is a fragmentary sectional view taken along the line indicated at 5—5 in FIG. 3.

The present invention provides an improved splash guard that has novel stiffening means for the upper portion so that the lower portion of even a relatively large guard, say 24 by 30 inches, flexes less than six inches from the vertical.

In the drawings, a truck 1 is shown having rear wheels 3 and a rear tail board 4. A novel splash guard 10, of a rubbery material that is preferably a tire carcass formulation having a natural rubber base, is rigidly mounted near each end of the tail board 4 to the rear of each set of the rear wheels to prevent the undesirable splashing of water and mud rearwardly therefrom.

Each of the guards comprises a generally polygonal panel which is preferably rectangular in shape as shown in the drawings. Each panel comprises a flat smooth body 11, a raised upper margin 12, and two generally parallel raised side margins 14 and 15.

According to the present invention, an improved splash guard is made by embedding therein stiffening means comprising a pair of one-piece rods 20, one disposed generally vertically along the upper portion 14a of side margin 14 and extending horizontally across end portion 12a of the upper margin 12 from the upper left corner of panel, and the other rod being disposed along the upper portion 15a of the side margin 15 and across a portion 12b of the upper margin from the right upper corner of the panel.

The rods stiffen and reinforce the upper portion of the panel so that only the bottom portion flexes and, generally the rods extend below the mid point of side margin so that the panel will flex less than six inches from the vertical when the truck is driven.

Each rod has an elongated U-shaped portion 25 that extends along generally parallel to the upper side margins, the U-shape 25 including two generally vertically disposed and parallel legs 30 and 31 that are spaced apart by the embedding rubber, and a center rod portion 32 between the legs that is curved or arcuate in shape to avoid any sharp ends that might tear the rubbery material when the lower portion of the panel is flexed.

In the preferred embodiment shown in the drawings, the longer rod leg 30 has a distal end 35 that is generally horizontally disposed along the upper margin. The end 35 includes an eyelet 36 formed at the terminal thereof for receiving a bolt or other suitable fastening means by which the panel is rigidly secured to the tail board 4.

The shorter rod leg 31 also preferably is made with a smoothly rounded eyelet 38 formed at its upper end to keep away from using a sharp end that might tear the rubbery material.

In the preferred embodiment as indicated in the drawings, the width of each of the side margins is preferably about 3 to 6 times the diameter of the rod 20 and the vertical legs 30 and 31 are spaced apart by the embedding rubber a distance equal to about once to twice the diameter of the rod. Likewise, the best results, from the standpoint of an efficient long-lasting splash guard, are obtained when the thickness of the raised margins 12, 14 and 15 are about 1½ to 2 times the diameter of the rod.

A suitable splash guard may have outside dimensions of about 24 inches by 30 inches, a panel body of about ¼ inch in thickness, raised side margins about 1¼ inches in width and ⅝ inch in thickness, and an upper margin about 3 inches in width and the same thickness as the side margins. For such a panel, it is preferred that the stiffening rods have a diameter of about ¼ inch, that the longest vertical leg 30 have a length of about 18 inches and that the legs 30 and 31 be spaced apart by the embedding rubber a distance of about ¼ to ½ inch and that the distal end 35 extend horizontally along the upper margin about 5 inches.

The improved splash guard of the present invention, having substantially completely embedded therein the novel stiffening rods of the present invention, can be rigidly fastened to the truck body, whereby the relatively short lower portion of the panel is flexible. The flexing of the lower portion will generally be less than 6 inches from the vertical when the truck is in operation, and, yet, the guard is easily installed and is long lasting.

What is claimed is:

1. A splash guard adapted for use behind the rear wheels of a vehicle such as a truck and the like and adapted to be rigidly mounted the back end thereof, the guard comprising a generally polygonal panel of a rubbery material, the panel having a generally horizontal upper margin portion and two generally parallel vertical side margin portions, said upper marginal portion and said side marginal portions being raised from and thicker than the central body of said panel, an upper panel portion including the upper margin portion adapted to be fastened rigidly to the back of the vehicle, a lower panel portion that is flexible, the flexing portion being not more than about ⅕ to ⅓ of the total length of the panel, and stiffening means for the upper portion of the panel to prevent the flexing thereof, said means comprising a one-piece metal rod embedded in each of the side marginal portions, said rod having an elongated generally U-shaped portion comprising two legs that are spaced apart by the embedded rubbery material and a curved center portion in between said legs, the center portion extending down its associated side margin portion at least past the mid-point thereof so that the center portion is located nearer the bottom of the panel than the top, one of said legs of the U-shape having an upper distal end that is generally horizontally disposed along at least a portion of the upper marginal portion to reinforce the same, there being a hook provided on the terminal end of said distal end adapted to receive a fastening means such as a bolt for rigidly securing the panel to the vehicle.

2. A splash guard comprising a generally rectangular panel of a rubbery material, the panel having a substantially flat smooth body and a generally horizontally disposed upper margin and generally vertically disposed side margins, said upper margin and the side margins being thicker than the body, stiffening means for the side margins comprising a pair of one-piece rods, each rod embedded in the panel and reinforcing the upper side margins and at least a portion of the upper margin adjacent its associated side margin, each rod including a pair of generally parallel vertical legs that are spaced apart by the embedding rubber of the associated side margin, there being a curved center rod portion between said legs to allow flexing of the lower panel without damage thereto, the curved portion being located at least as far down as the mid-point of the side margin whereby flexing of the lower portion of the panel is held to a minimum.

3. A splash guard comprising a rectangular panel of rubber having a smooth flat body and a horizontal upper margin and two generally parallel side margins, stiffening means for the upper portion of the panel whereby only the lower portion flexes, the stiffening means comprising a pair of one-piece rods, each rod embedded in an upper corner of the panel so that the rod is embedded in a portion of the upper margin and one of the side portions, each rod having an elongated U-shaped portion having two generally parallel legs that run along its associated side margin for at least half the length thereof, each rod having a curved center portion connecting each of the two legs, and the upper portion of at least one of the legs having a distal portion that extends horizontally along the upper margin, said distal portion including an eyelet adapted for receiving a bolt used for fastening said panel to a vehicle.

4. A splash guard as defined in claim 3 in which the thickness of each of the side portions is about 1½ to 2 times the diameter of the rod, and the vertical legs of the rod are spaced apart by the embedding rubber a distance of about once to twice the diameter of the rod.

5. A splash guard as defined in claim 4 in which the width of the side margin is about 3 to 6 times the diameter of the rod.

References Cited in the file of this patent

UNITED STATES PATENTS

| | | |
|---|---|---|
| 2,683,612 | Bacino | July 13, 1954 |
| 3,027,178 | Eaves | Mar. 27, 1962 |
| 3,051,508 | Federspiel | Aug. 28, 1962 |
| 3,059,945 | Robb | Oct. 23, 1962 |